Feb. 26, 1957 G. L. KAMPA 2,783,015
MOUNT FOR REARVIEW MIRRORS
Filed Dec. 10, 1953 2 Sheets-Sheet 1
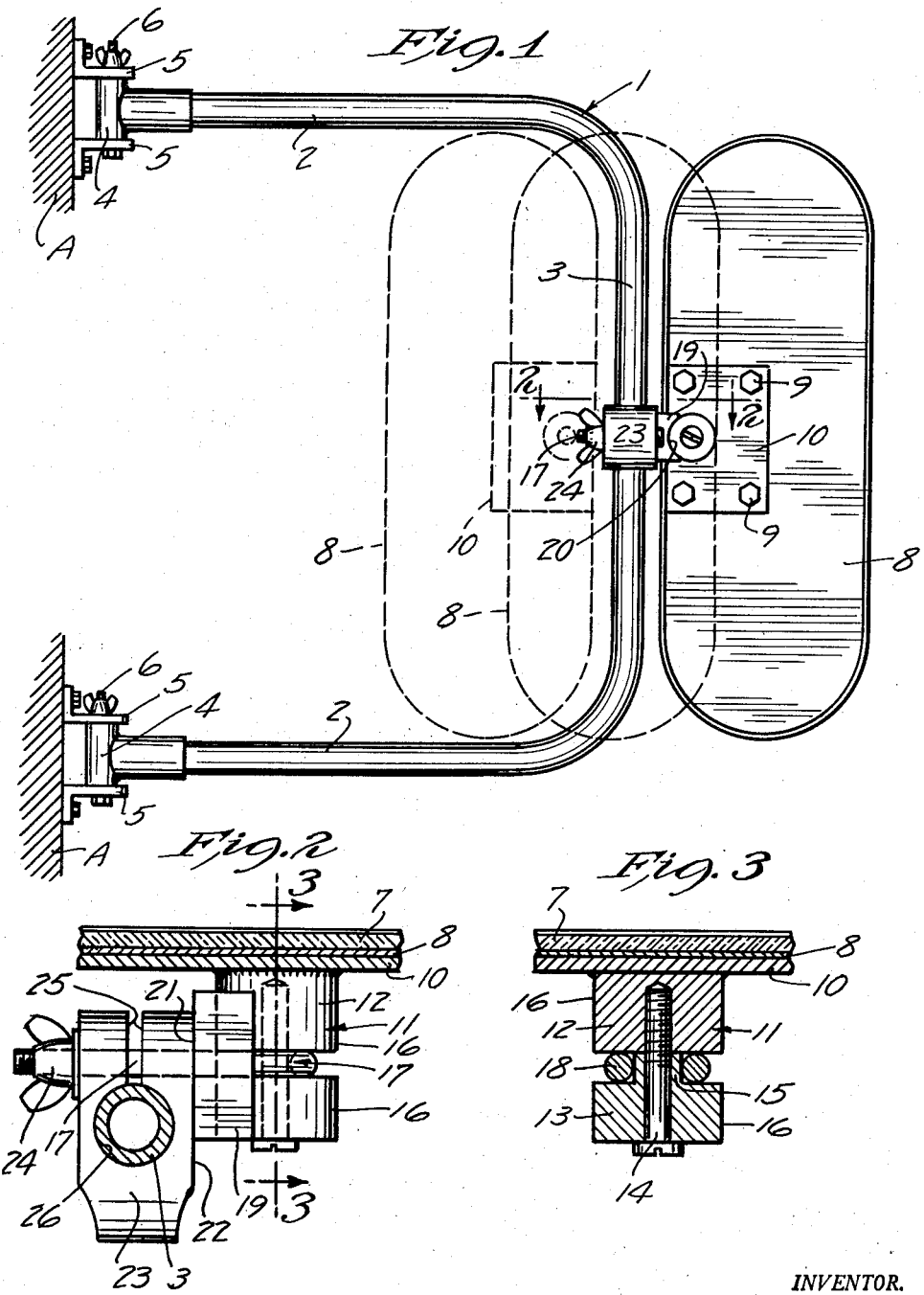
INVENTOR.
George L. Kampa
BY
Merchant & Merchant
ATTORNEYS Feb. 26, 1957 — G. L. KAMPA — 2,783,015
MOUNT FOR REARVIEW MIRRORS
Filed Dec. 10, 1953 — 2 Sheets-Sheet 2
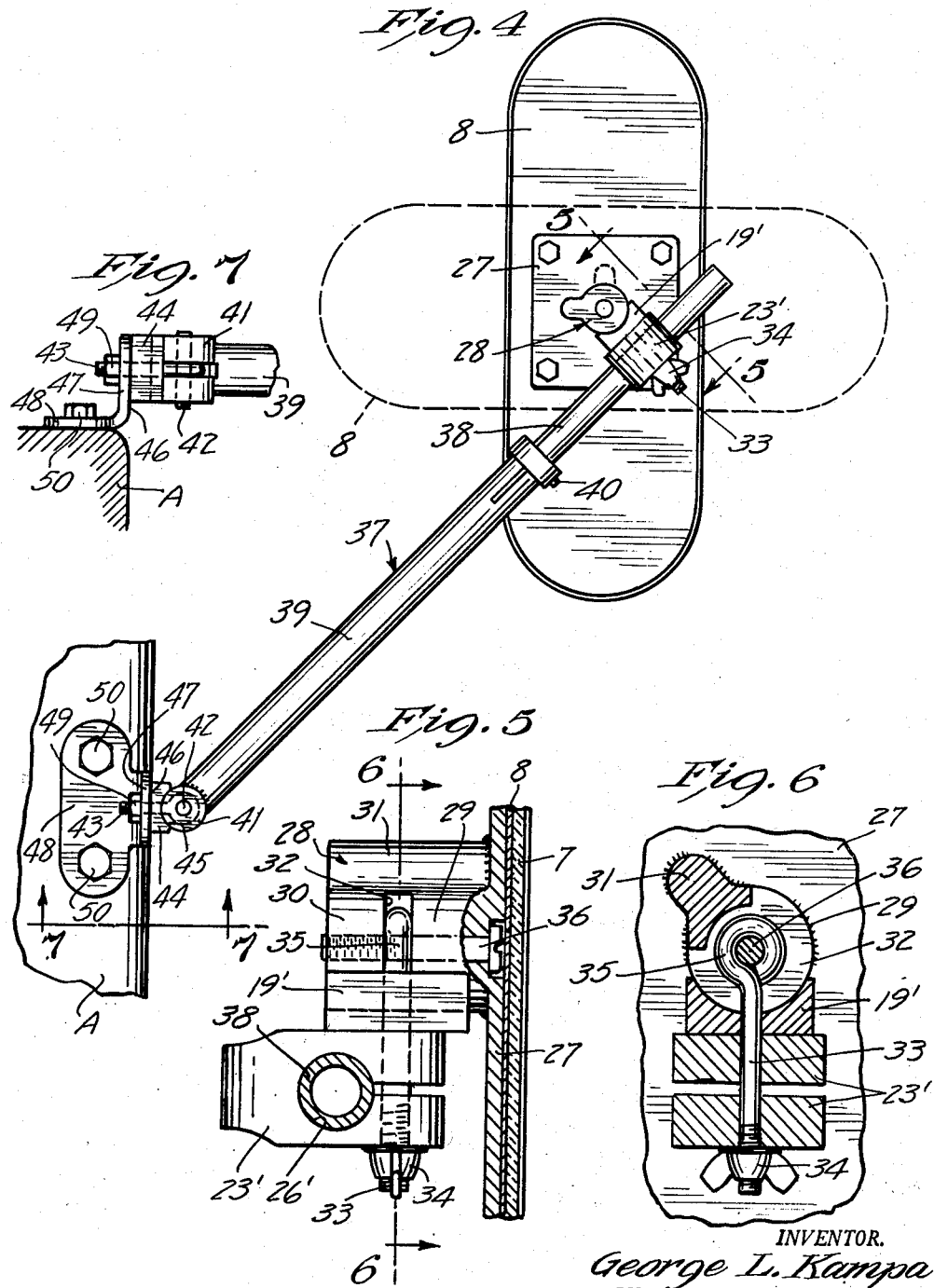

United States Patent Office 2,783,015
Patented Feb. 26, 1957

2,783,015
MOUNT FOR REARVIEW MIRRORS

George L. Kampa, Minneapolis, Minn., assignor to Pre-Vue Co., Inc., Minneapolis, Minn., a corporation of Minnesota Application December 10, 1953, Serial No. 397,431

3 Claims. (Cl. 248—279)

My invention relates to rear view mirrors for automotive vehicles, and more particularly to a novel mounting means therefor.

The primary object of my invention is the provision of a novel mounting means for rear view mirrors which will permit a great range of adjustment whereby to afford vision to the driver of the vehicle under varying circumstances, such as the height of the driver's line of vision, his position within the vehicle, the width of the load carried by the vehicle, the proximity of obstruction, etc.

A still further object of my invention is the provision of a device of the class immediately above described wherein the mirror is held fast in all positions of adjustment, and wherein the adjustments are relatively simple and take a minimum of time and effort.

A still further object of my invention is the provision of a device of the class described which is inexpensive to produce, which has a minimum of working parts, and which is extremely durable in use.

The above and still further objects of my invention will become apparent from the following detailed specification and appended claims.

Referring to the drawings, wherein like characters indicate like parts throughout the several views:

Fig. 1 is a view in elevation looking rearwardly with respect to the vehicle and showing my mirror and novel mounting means therefor;

Fig. 2 is an enlarged fragmentary view partly in plan and partly in horizontal section taken substantially on the line 2—2 of Fig. 1;

Fig. 3 is an axial section taken substantially on the line 3—3 of Fig. 2;

Fig. 4 is a view corresponding to Fig. 1, but showing a modified form of my invention;

Fig. 5 is an enlarged fragmentary detail partly in plan and partly in transverse section taken substantially on the line 5—5 of Fig. 4;

Fig. 6 is a fragmentary transverse section taken substantially on the line 6—6 of Fig. 5; and Fig. 7 is a fragmentary detail partly in bottom plan and partly in section taken substantially on the line 7—7 of Fig. 4.

In the preferred embodiment of the invention illustrated in Figs. 1-3 inclusive, an elongated generally U-shaped mounting rod is indicated in its entirety by the numeral 1 and comprises a pair of upper and lower horizontal legs 2 connected by a generally vertical portion 3. At their free ends, the legs 2 are provided with trunnion-forming elements 4, each of which is pivotally secured to a pair of mounting brackets 5 by means of thumbnut-equipped bolts or the like 6 extending through said fittings 4 and brackets 5. The brackets 5 are bolted or otherwise suitably anchored to the cab body A of an automotive vehicle adjacent the driver's seat.

As shown, the mirror 7 is conventionally mounted in a suitable frame 8. Secured to the intermediate portion of the frame 8, and adjacent one side thereof, by means of studs 9, is a mounting plate 10 having a boss 11 projecting laterally outwardly from one side edge portion thereof. As shown, the boss 11 includes inner and outer boss sections 12 and 13 which are secured together by means of an anchoring bolt 14. Preferably and as shown, the boss section 13 is provided with a reduced axial pintle-forming element 15 which bears against the outer end of the boss section 12. The boss sections 12 and 13 are generally cylindrical in form to provide arcuate surface portions 16. A bolt 17 has its inner end 18 encompassing the pintle element 15 and projects radially outwardly between the boss sections 12 and 13 for circumferential swinging movements about the axis of the boss 11. A shoe 19 is provided at one side with an arcuate surface 20 which is adapted to engage the arcuate surface portion 16 of the boss 11, and a relatively flat surface 21 on its opposite side which is adapted to abut one flat side surface 22 of a split clamping head 23. The bolt 17 is adapted to extend through suitable alignable openings in the shoe 19 and clamping head 23, and is provided at its outer end with threads to receive a washer-equipped clamping wing nut or the like 24. With reference particularly to Fig. 2, it will be seen that the clamping head 23 is split, as indicated at 25, which split opens into an enlarged central opening 26 that normally loosely receives the intermediate portion 3 of the mounting rod 1. It should be obvious that tightening of the clamping nut 24 on the bolt 17 will cause locking friction to be set up between the boss 11 and the arcuate surface 20 of the shoe 19, as well as between the abutting sides 21 and 22 of the shoe 19 and the clamping head 23, respectively. Furthermore, the clamping head encompassing portion of the mounting rod 1 will be frictionally locked in the central opening 26 of the clamping head 23 so that movements of the elements 11, 19, and 23 in all directions are effectively prevented.

As indicated by the full and dotted lines of Fig. 1, loosening of the wing nut 24 will permit the mirror 7 to be swung about the axis of the boss 11 and about the axes of the bolt 17 and the intermediate portion 3 of the mounting rod 1. Furthermore, when the nut 24 is loosened, the mirror 7 may be slidably moved longitudinally of said central portion 3 to raise and lower the same. Thus, by releasing the single nut 24, the mirror 7 may be placed in a desired position and frictionally locked therein against accidental movement.

Referring now to the modified structure of Figs. 4-7 inclusive, the frame 8 of the mirror 7 is provided with a central mounting plate 27. A boss 28 extends laterally outwardly from the mounting plate 27 and comprises a pair of integrally formed inner and outer boss sections 29 and 30 respectively, reinforced by a longitudinally extending rib 31. The boss sections 29 and 30 define an intermediate laterally outwardly opening slot 32 in which is mounted for circumferential movements a radially outwardly projecting bolt 33. The bolt 33 is threaded at its outer end to receive a washer-equipped clamping wing nut 34. The inner end 35 of the bolt 33 encompasses a pintle 36 in the nature of a screw or stud extending axially outwardly through the boss sections 29 and 30. A shoe 19' and clamping head 23' are identical in all respects to the shoe 19 and head 23 of the structure of Figs. 1-3 inclusive, and are mounted on the bolt 33 in the same manner as the shoe 19 and clamping head 23.

A mounting rod 37 comprises an outer rod section 38 telescopically received within a tubular inner rod section 39 for extending and retracting movements with respect thereto. The rod section 38 is rotatable and axially slidably received in the central opening 26' of the clamping head 23'. With this arrangement the mirror 7 of Fig. 4 may be adjusted rotatively around the axis of the pintle 36, about the axes of the bolt 33 and mounting rod 37, as well as longitudinally with respect to the mounting rod section 38. A conventional friction collar 40 is mounted on the outer end of the rod section 39 to frictionally hold the rod section 38 in any desired set position.

The inner end of the mounting rod section 39 is provided with a bifurcated trunnion-like head 41, through which projects a transversely extending pintle 42 that has mounted thereon, for swinging movements, an eye-bolt 43. The eye-bolt 43 projects radially outwardly from the head 41 through a shoe 44 that has an arcuate surface 45 which engages the trunnion-forming head 41 of the rod section 39 and an opposite flat surface 46 which engages a flat upstanding portion 47 of a mounting bracket 48. The eye-bolt 43 extends through the upstanding portion 47 and is provided with a locking nut 49 which, when tightened, frictionally locks the mounting rod 37 against swinging movements with respect to the shoe 46 about the axis of the pintle 42, and the shoe 46 with respect to the bracket 48 about the axis of the eye-bolt 43. As shown, the bracket 48 is secured to the cab A of the vehicle body by means of a conventional bolt or stud 50.

My invention has been thoroughly tested and found to be completely satisfactory for the accomplishment of the above objects, and while I have shown a preferred and one modified form thereof, I wish it to be understood that same is capable of still further modification within the scope of the appended claims.

What I claim is:

1. In a mount for rear view mirrors, an elongated mounting rod, a mounting plate adapted to receive and support said mirror, a boss projecting laterally from said plate, said boss comprising a pair of axially spaced generally cylindrical inner and outer sections and an axial pintle element between said inner and outer sections, and a connection between said mounting rod and boss, said connection including a bolt having an eye at one end encompassing said pintle element, said bolt extending radially outwardly from said pintle element for circumferential movements with respect to said boss, a clamping head mounted on said rod for compound axial sliding and rotary movements, a shoe interposed between said boss and clamping head, said shoe having a flat surface engaging a cooperating flat surface portion of said clamping head and an arcuate surface concentric with said boss and slidably engaging cylindrical surface portions of both sections thereof, said bolt projecting through aligned openings in said shoe and clamping head at one side of said mounting rod and transversely thereof, said bolt connecting said shoe and clamping head for relative pivotal movements, and a clamping nut screw threaded on the outer end of said bolt and operatively engaging said head to frictionally lock said boss, shoe, clamping head and mounting rod against relative movement.

2. The structure defined in claim 1 in which said outer boss section includes said pintle element, and in further combination with screw means detachably securing said sections together.

3. The structure defined in claim 1 in which said boss comprises axially spaced inner and outer integrally formed boss sections, said boss sections being spaced apart to receive the eye of said bolt, and in further combination with a pintle element extending axially through said sections and the eye of said bolt.

References Cited in the file of this patent

UNITED STATES PATENTS

| | | |
|---|---|---|
| 575,717 | Homan | Jan. 26, 1897 |
| 1,057,658 | Nichols | Apr. 1, 1913 |
| 1,358,159 | Kern | Nov. 9, 1920 |
| 1,578,653 | Gallagher | Mar. 30, 1926 |
| 1,674,538 | Williams | June 19, 1928 |
| 1,797,847 | Vandagriff | Mar. 24, 1931 |
| 1,817,353 | Craddock | Aug. 4, 1931 |
| 2,620,152 | Niles | Dec. 2, 1952 |